United States Patent [19]

Comparato

[11] Patent Number: 4,530,290
[45] Date of Patent: Jul. 23, 1985

[54] APPARATUS FOR FLUIDIZING A PARTICULATE MATERIAL IN A CONVEYING GAS

[75] Inventor: Joseph R. Comparato, Bloomfield, Conn.

[73] Assignee: Combustion Engineering, Inc., Windsor, Conn.

[21] Appl. No.: 576,599

[22] Filed: Feb. 3, 1984

[51] Int. Cl.³ .............................................. F23G 5/00
[52] U.S. Cl. .................... 110/245; 34/57 A; 432/58; 110/347
[58] Field of Search ................... 432/14, 58; 110/245, 110/346, 106, 347; 34/10, 57 A

[56] References Cited

U.S. PATENT DOCUMENTS

| | | | |
|---|---|---|---|
| 3,774,759 | 11/1973 | Weintraub et al. | 209/474 |
| 3,985,516 | 10/1976 | Johnson et al. | 34/10 |
| 4,324,544 | 4/1982 | Blake | 110/347 |
| 4,325,833 | 4/1982 | Scott | 110/345 |
| 4,356,779 | 11/1982 | Porter et al. | 110/245 |
| 4,372,228 | 2/1983 | Korenberg | 110/347 |
| 4,441,822 | 4/1984 | Biswas et al. | 34/57 A |

*Primary Examiner*—Henry C. Yuen
*Attorney, Agent, or Firm*—William W. Habelt

[57] ABSTRACT

A fluidizing feed apparatus (20) for supplying particulate material to a fluidized bed furnace (12). A housing (22) defines a chamber which is divided by a perforated distribution plate (24) into a gas plenum (26) beneath the plate and a particulate fluidizing plenum (28) above the plate. Conveying gas is fed under pressure to the gas plenum to pass upwardly therefrom through the perforated distribution plate. The upwardly directed conveying gas fluidizes the particulate material so as to establish a discrete bed (60) of fluidized particulate material superadjacent the distribution plate (24) and a splash zone (70) thereabove. Transport conduits (14) open into the splash zone (70) at a selected distance above the surface (65) of the discrete bed (60) to receive particulate material and conveying gas therefrom for transport to the fluidized bed (16) of the furnace (12).

2 Claims, 5 Drawing Figures

APPARATUS FOR FLUIDIZING A PARTICULATE MATERIAL IN A CONVEYING GAS

BACKGROUND OF THE INVENTION

The present invention relates to an apparatus for fluidizing a particulate material in a conveying gas for transport and distribution, and, more particularly, to such an apparatus adapted for feeding particulate material in a conveying gas to a fluidized bed furnace.

In a typical present day fluidized bed furnace, particulate fuel, such as coal having a top size ranging from about 3.0 to about 6.5 mm, is typically fed to and combusted within a fluidized bed of similar sized particulate material at relatively low temperatures of 760 C. to 925 C. If the fuel being burned contains sulfur, it is customary that the particulate material making up the bed be comprised of a sulfur absorbent, most commonly limestone, in addition to the particulate fuel. Fluidizing air, which also serves as combustion air, is supplied to the fluidized bed from an air plenum located beneath the bed support plate. The fluidizing air passes upwardly from the air plenum into the fluidized bed through a plurality of holes in the bed support plate at a flow rate sufficiently high to fluidize the particulate material within the fluidized bed.

A number of different approaches have been suggested for feeding particulate material to the bed, including overbed feed systems and underbed feed systems. One particular underbed feed system suitable for feeding particulate material to a fluidized bed is disclosed in U.S. Pat. No. 4,356,779. As disclosed therein, a fuel feeder is disposed beneath the fluidized bed combustor for entraining fuel in air and then feeding that fuel upwardly into the combustor. The feeder housing defines a chamber which is divided into upper and lower sections by a horizontally disposed perforated distributor plate. The particulate fuel to be supplied to the fluidized bed is fed into the upper chamber above the perforated distributor plate while conveying air is supplied to the lower chamber beneath the perforated distributor plate. The air supplied to the lower chamber passes upwardly through the perforated distributor plate to fluidize and entrain the particulate coal in the upper region of the chamber. The entrained coal is then carried upwardly from the chamber to the fluidized bed boiler through transport lines which open to the fluidizing chamber through the roof of the feeder.

One problem encountered in using such a fluidizing feeder to convey particulate coal to a furnace through a plurality of transport lines lies in controlling not only the overall output of particulate material from the feeder, but also in selectively distributing that output as desired through the various transport lines leading from the feeder. In the feeder disclosed in U.S. Pat. No. 4,356,779, the particulate material to be conveyed must first be entrained in the conveying gas in a venturi section disposed intermediate the transport lines and the fluidizing chamber. Control of the overall output of such a feeder is limited by the control possible over the entrainment velocity attainable by the conveying gas. Additionally, the output of particulate material from the disclosed feeder is evenly distributed amongst the various transport lines leading from the feeder. No provision is made to permit an uneven or selective distribution of the output.

Accordingly, it is an object of the present invention to provide an apparatus for fluidizing a particulate material in a conveying gas wherein the output of particulate material is controllable as a function of the input of particulate material to the feeder.

Further, it is an object of the present invention to provide an apparatus for fluidizing a particulate material in a conveying gas wherein the output of particulate material is selectively distributable amongst a plurality of transport lines leading from the feed apparatus.

SUMMARY OF THE INVENTION

The apparatus of the present invention comprises a housing defining a chamber therein which is divided into a gas plenum and a particulate fluidizing plenum above the gas plenum by means of a perforated bed support plate disposed within the housing across the chamber. Gas supply means open into the gas plenum for conveying pressurized conveying gas to the gas plenum to pass upwardly therefrom through the gas passages of the perforated bed support. The upwardly passing conveying gas fluidizes the particulate material in the particulate fluidizing plenum so as to establish within the housing a discrete bed of fluidized particulate material superadjacent the bed support plate and a splash zone above the discrete bed. A fraction of the fluidized particulate material carries over from the discrete bed into the splash zone as bubbles of upwardly passing conveying gas erupts through the surface of the discrete bed.

Particulate feed means penetrates the housing and extends into the fluidizing plenum so as to deposit particulate material into the fluidized bed established therein at a location beneath the surface of the discrete bed. A plurality of transport conduits also penetrate the housing and extend into the particulate fluidizing plenum so as to open into the splash zone at a desired distance above the surface of the discrete bed. The transport conduits receive particulate material and conveying gas from the splash zone and convey the received particulate material in the conveying gas to a desired designation such as the combustion chamber of a fluidized bed furnace.

Preferably, each transport conduit extending into the fluidizing plenum is independently positionable within the splash zone of the fluidizing plenum so as to open at a selected distance above the discrete bed. The "density" of particulate solids in the splash zones decreases with distance above the surface of the discrete bed. Thus, the solids flow through the transport conduits is a function of the distance above the discrete bed at which the transport conduit opens to the splash zone to receive particulate material therefrom. In the preferred embodiment, the solids flow through any particular transport conduit may be selectively increased or decreased by repositioning that transport conduit so as to open at a different distance above the surface of the discrete bed.

BRIEF DESCRIPTION OF THE DRAWING

Other objects, features and advantages of the present invention will be evident from the following description of the preferred embodiment of the fluidizing feed apparatus of the present invention and the accompanying drawing wherein the feed apparatus is utilized to supply particulate material to a fluidized bed furnace.

DESCRIPTION OF A PREFERRED EMBODIMENT

Figure 1:
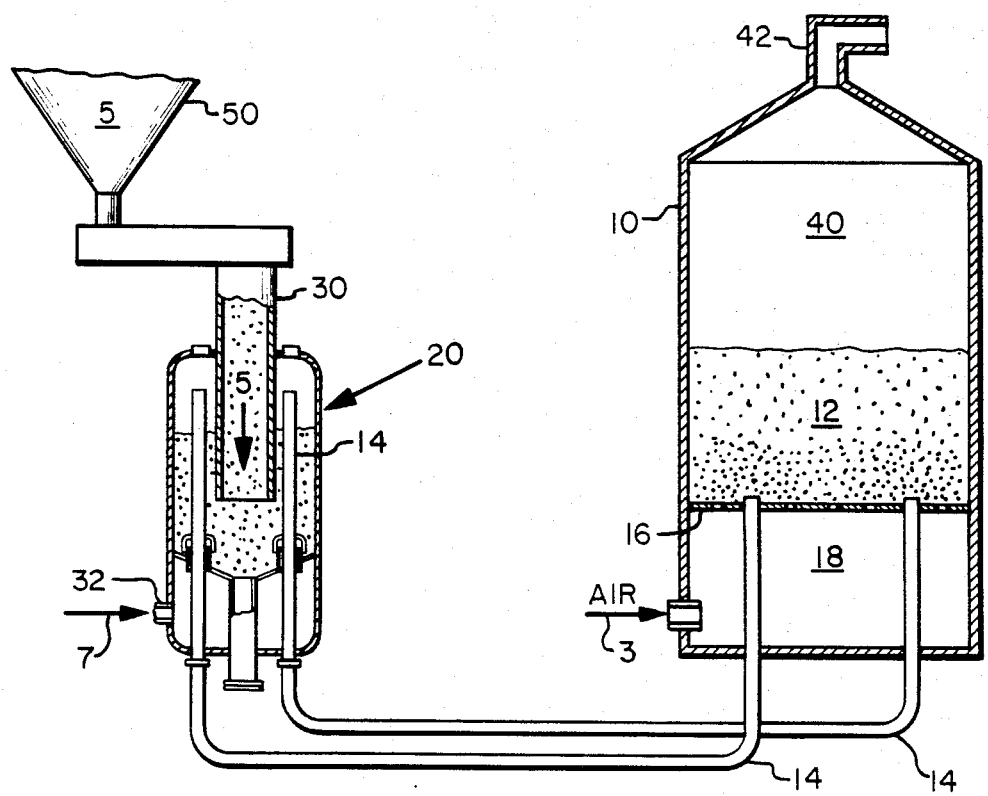
FIG. 1 is a diagrammatic view, partly in section, showing the feed apparatus of the present invention supplying particulate coal and sulfur absorbent to a fluidized bed furnace.

Referring now to FIG. 1, there is depicted therein a fluidized bed furnace 10 wherein a sulfur-containing fuel, such as particulate coal, is combusted in a fluidized bed 12 of particulate material which includes a sulfur oxide absorbent. Typically, the sulfur oxide absorbent is selected from the group consisting of limestone, dolomite and soda ash. It is to be understood that the term limestone used herein is to be read to encompass other sulfur oxide absorbents including, but not limited to, dolomite or soda ash, and that the term particulate coal as used herein is to be read to include other particulate fuels.

Particulate coal is supplied to the furnace fluidized bed 12 through a plurality of transport lines 14 which extend upwardly into the bed through the bed support plate 16 from the fluidizing feed apparatus 20. Combustion air is supplied to the air plenum 18 located beneath the fluidized bed support plate 16 and passes upwardly from the air plenum 18 into the fluidized bed 12 through a plurality of airports in the bed support plate 16 at a flow rate sufficiently high enough to fluidize the particulate material within the fluidized bed 12. The particulate coal combusts within the fluidized bed 12 and the freeboard region 40 thereabove to form hot flue gas which passes out of the fluidized bed furnace 10 through flue 42 to downstream steam generating equipment, not shown.

The feed apparatus 20 of the present invention is depicted disposed alongside the fluidized bed furnace 10 and connected therewith by the transport lines 14 which extend downwardly from the feed apparatus 20, thence horizontally over to the fluidized bed furnace 10, and thence upwardly through the bed support plate 16 to open into the fluidized bed 12. The feed apparatus 20 comprises a housing 22, preferably a cylindrical housing, defining a chamber therein which is divided by a perforated distribution plate 24 into a gas plenum 26 disposed beneath the distribution plate 24 and a particulate fluidizing plenum 28 disposed above the distribution plate 24.

Conveying gas 7 passes into the fluidizing feed apparatus 20 through gas supply means 32 which opens into the gas plenum 26 beneath the bed support plate 24 through an opening in the housing 22. The pressurized conveying gas 7 supplied to the gas plenum 26 passes upwardly through a plurality of flow passages 34 in perforated distribution plate 24 into the fluidizing plenum 28 whereby the particulate material 5 fed to the particulate fluidizing chamber 28 is fluidized so as to establish a discrete bed 60 of fluidized material superadjacent the bed support plate 24 and a splash zone 70 above the discrete bed of fluidized material.

A plurality of transport conduits 14 penetrate the housing 22 of the feeder 20 and provide a plurality of flow passages interconnecting the feeder 20 with the fluidized bed 12 in the fluidized bed furnace 10. The transport conduits 14 extend into the fluidizing plenum 28 of the housing 22 so as to open into the splash zone 70 at a distance above the discrete bed, that is at a distance above the surface 65 of the discrete bed which forms the interface between the discrete fluidized bed 60 and the splash zone 70. The transport conduits 14 receive particulate material and conveying gas from the splash zone 70 of the fluidizing plenum 28 and convey the received particulate material in the conveying gas from the feeder 20 to the fluidized bed 12 of the furnace 10.

The particulate materials to be fluidized, which when feeding a fluidized bed furnace may be a particulate coal, alone or together with a particulate sulfur oxide absorbent such as limestone, are supplied to the particulate fluidizing chamber 28 of the feed apparatus 20 from storage silo 50 via a conventional feeder 62 through particulate feed means 30. Preferably, the particulate feed means 30 comprises a tubular conduit which penetrates the roof of the housing 22 and extends downwardly into the discrete fluidized bed 60 so that particulate material passing therethrough is deposited into the discrete bed 60 beneath the surface 65 thereof at a location superadjacent the perforated distribution plate 24. The column of particulate material retained within the tubular conduit 30 provides a material head that seals the feeder 62 and silo 50 from the pressure in the fluidizing chamber 28. Alternately, conventional seal means, such as a two-valve lock chamber, may be used to seal against the pressure in the chamber of the feeder 20.

The perforated bed support plate 24 disposed within the housing 22 of the feeder 20 is in the form of a concave upward conical dish as shown in the drawings so as to provide a downward sloping surface. A drain opening 38 is disposed in the sloping distribution plate 24 at the lower region thereof. A drain pipe 44 opens at its upper end to the drain opening 38 in the sloping distribution plate 24 for receiving any non-fluidized particulate material 11 from the particulate fluidizing plenum 28. The drain pipe 44 extends externally to the housing 22 for removing the non-fluidized particulate material passing through the drain pipe 44 from the particulate fluidized plenum 28.

The plurality of transport conduits 14 penetrating the housing 22 and extending into the particulate fluidizing plenum 28 open into the splash zone 70 at a selected distance above the surface 65 of the discrete bed 60 for receiving particulate material and conveying gas from the splash zone 70. Particulate material is carried over from the discrete bed 60 into the splash sone 70 as bubbles of upwardly passing conveying gas erupt into the splash zone 70 from the surface 65 of the discrete bed 60.

At typical conveying gas velocities on the order of 10 feet per second, a discrete bed 60 of fluidized particulate material having a well defined surface 65 is formed. The particle density within the discrete bed 60 is relatively uniform at a relatively high value on the order of 1000 pounds of particulate material per pound of conveying gas. However, at the surface 65 of the bed 60, there is an abrupt and very sharp drop in particle density with the particle density then continuously decreasing with increasing distance into the splash zone, i.e., increasing distance above the surface of the discrete bed.

It is envisioned that the average particle density in the splash zone 70 would be a function of the input article flow rate. That is, it is believed that the introduction of particulate material into the splash zone 70 is a displacement controlled process. Therefore, once an equilibrium bed level is established, typically a few inches below the openings of the transport conduits 14, the rate of eruption of particulate material from the bed surface 65 into the splash zone 70 will be equal to the rate of input of particulate material to the discrete bed 60 through the particulate feed means 30 which open into the bed at a location below the surface of the discrete bed 60.

In accordance with the present invention, the transport conduits 14 extend into the splash zone 70 a selected distance so as to receive particulate material and conveying gas from the splash zone 70 at a rate related directly to the local particle density at that particular bed 60. As the local particle density decreases with increasing distance from the surface of the bed, the flow rate of particulate material through the transport conduits 14 will depend upon the distance above the surface 65 of the discrete bed 60 at which the transport conduits open to the splash zone 70.

Figure 2:
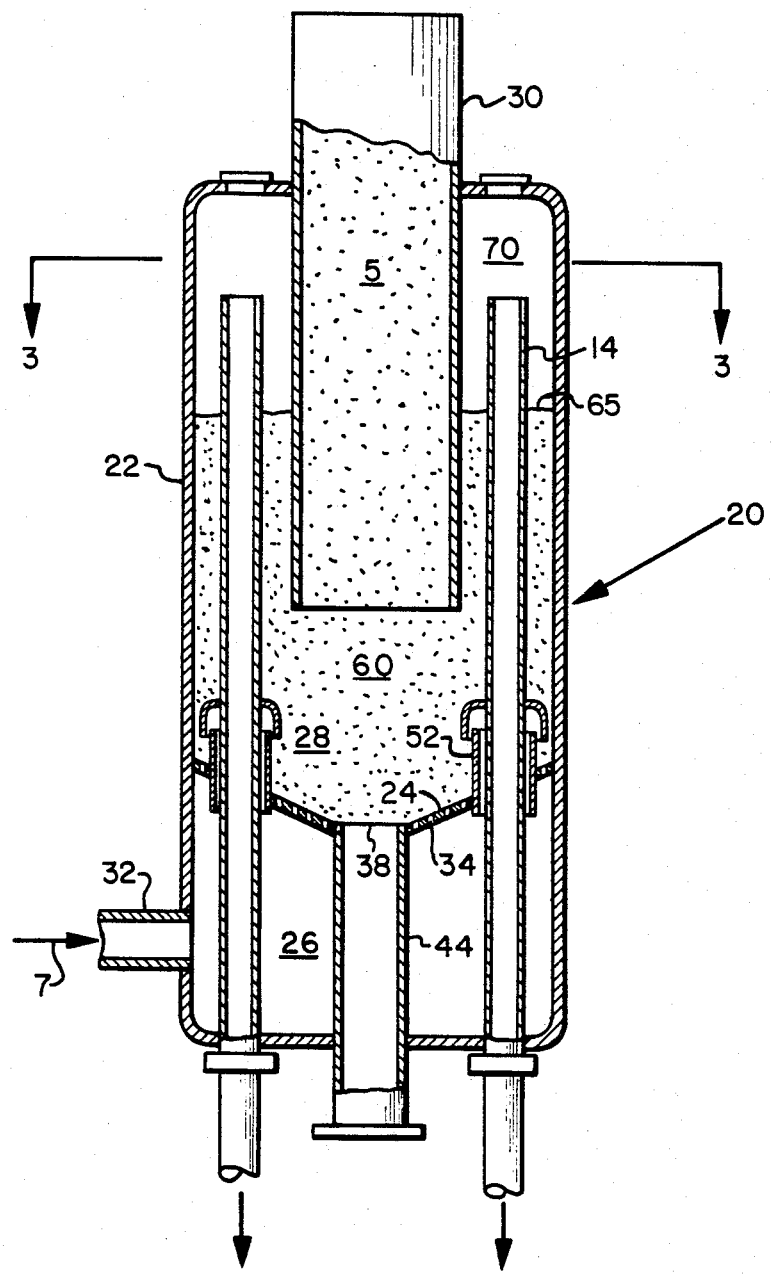
FIG. 2 is a cross-sectional elevational view of the feeder apparatus of the present invention.
Figure 3:
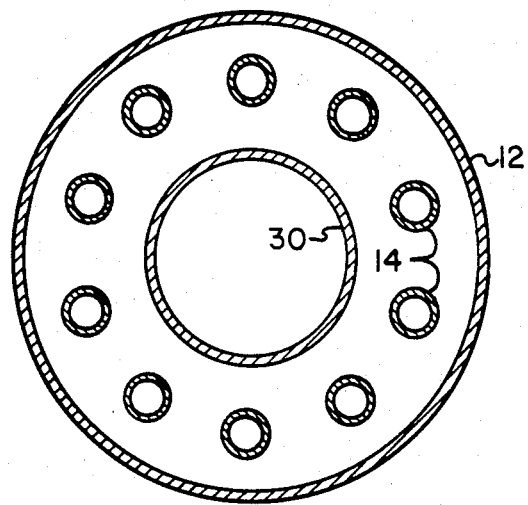
FIG. 3 is a cross-sectional plan view along line 3—3 of FIG. 2.

In the preferred embodiment of the present invention, as best illustrated in FIGS. 2 and 3, the transport conduits 14 comprise a plurality of elongated tubular members arranged at circumferentially spaced intervals in the annular space between the particulate feed means 30 and the housing 22. Each transport conduit 14 penetrates the housing 22 from below and extends vertically upward through the gas plenum 26, thence through the bed support bed 24 and the discrete bed 60 to open into the splash zone 70 at the selected distance above the surface 65 of the discrete bed 60.

Further in accordance with the present invention, each transport conduit 14 is independently positionable within the splash zone 70 so as to be adjustable to open at any selected distance above the surface 65 of the discrete bed 60. If all of the plurality of transport conduits 14 open to the splash zone 70 at the same distance above the surface 65 of the discrete bed 60, each conduit would see the same local particle density and the flow rate of particulate material through the conduits would be equalized.

If, however, it was desired to change the flow rate of particulate material through certain transport conduits while increasing the flow rate of others, the positioning of the openings to those conduits with respect to the surface 65 of the discrete bed 60 could be changed. For instance, if it was desired to decrease coal flow to a certain portion of the fluidized bed 16 of the furnace 12, the respective transport conduits 14 serving that portion of the bed 16 could be repositioned so as to open to the splash zone 70 at a further distance above the surface 65 of the discrete bed 60. Conversely, if it was desired to increase coal flow to a certain portion of the fluidized bed 16 of the furnace 12, the respective transport conduits 14 serving that portion of the bed 16 could be repositioned so as to open to the splash zone 70 closer to the surface 65 of the discrete bed 60 In this manner, the flow rate of particulate material from the feeder 20 of the present invention may be distributed amongst the various transport conduits leading therefrom.

Figure 4:
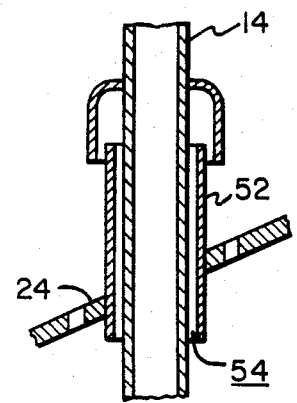
FIG. 4 is an enlarged cross-sectional elevational view within line 4—4 of FIG. 2.

In order to facilitate the repositioning of the transport conduits 14 as described hereinbefore, it is preferred that a tubular sleeve 52 be disposed coaxially about each transport conduit 14 where the transport conduit penetrates the distribution plate 24. As best seen in FIG. 4, the tubular sleeves 52 are mounted to and penetrate the distribution plate 24 about each transport conduit 14 so as to form an annular opening 54 about each transport conduit 14. The annular opening 54 defines a flow passage about each tubular conduit 14 providing gas flow communication between the gas plenum 26 beneath plate 24 and the particulate fluidizing plenum 28 thereabove. In operation, conveying gas passes upwardly through each annular passage 54 between each transport conduit 14 and tubular sleeve 52 associated therewith into the particulate fluidizing plenum 28 thereby preventing particulate material from accumulating between the transport conduits 14 and the distribution plate 24 or tubular sleeve 52. Such an accumulation of particulate material could cause the transport conduits to become frozen in position and preclude repositioning thereof to control the particulate flow rate therethrough.

Figure 5:
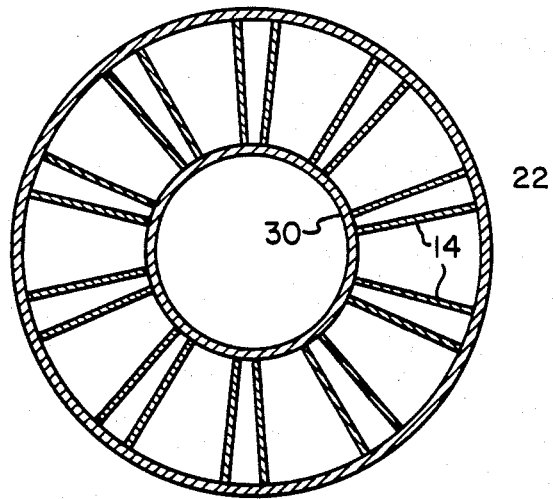
FIG. 5 is a cross-sectional plan view along line 3—3 of FIG. 2 illustrating an alternate embodiment.

Although shown in the preferred embodiment illustrated in FIGS. 2 through 4 as tubular conduits, it is to be understood that the transport conduits 14 are not limited to tubular conduits of circular cross-section as shown in FIG. 3. Rather, it is contemplated that the transport conduits 14 may comprise other forms such as the trapezoidal cross-section channels shown in FIG. 5. As depicted therein, the transport conduits 14 are again arranged at circumferentially spaced intervals about the annular space between the particulate feed means 30 and the housing 22, but are in the form of radially directed, trapezoidal cross-section channels which extend transversely between particulate feed means 30 and the housing 22.

The present invention has provided a feed apparatus for fluidizing a particulate material for transport in a conveying gas wherein the overall output of particulate material, as well as the distribution of the output amongst the various transport conduits leading therefrom, can be readily adjusted. The overall output of the feed apparatus is directly related to the input flow rate of particulate material to the bed of the feeder. That overall output can be distributed amongst the various transport conduits leading from the feeder by merely repositioning the conduits relative to each other with respect to the distance above the surface of the bed at which the conduits open to the splash zone of the feed apparatus. Furthermore, the inventory of material within the feeder 20 provides a capacity to smooth fluctuations in the input flow to the feeder. Thus, pulsations in material flow entering the feeder, such as those caused by a lock hopper pressure seal, would be attenuated in affecting the output flow.

Although the feed apparatus 20 of the present invention is shown as feeding a fluidized bed furnace 10, it is to be understood that the feed apparatus 20 of the present invention may be utilized in any situation where it is desired to transport a particulate material in a conveying gas. Accordingly, it is intended that the present invention be limited in spirit and scope only in a manner consistent with the claims appended hereto.

I claim:

1. An apparatus for fluidizing a particulate material for transport in a conveying gas comprising:

a. A vertically disposed housing defining a chamber therein;

b. A perforated bed support plate having a gas flow passage therethrough, said bed support plate disposed within said housing so as to extend across said housing thereby dividing said chamber into a gas plenum beneath said bed support plate and a particulate fluidizing plenum above said bed support plate;

c. gas supply means opening into said gas plenum for conveying pressurized conveying gas to said gas plenum to pass therefrom through the gas flow passages in said bed support plate whereby a portion of the particulate material fed to the fluidizing plenum is fluidized so as to establish a discrete bed of fluidized material superadjacent said bed support plate and a splash zone within said fluidizing plenum above said discrete bed;

d. particulate feed means extending vertically downwardly through said housing into said fluidizing plenum to open into said fluidizing plenum at a location within said discrete bed of fluidized particulate material;

e. a plurality of transport conduits for receiving particulate material fluidized in the conveying gas from the splash zone and conveying said received particulate material from said housing in the conveying gas, each of said transport conduits comprising an elongated tubular member penetraining said housing from below and extending vertically upward through said gas plenum, thence through said bed support plate and thence into said fluidizing plenum through said discrete bed to open into the splash zone above said discrete bed, each tubular member being independently positionable within the splash zone of the fluidizing plenum so as to open to the splash zone at any selected distance above said discrete bed, and f. a plurality of tubular sleeves mounted to and penetrating said bed support plate, one tubular sleeve disposed coaxially in closely spaced relationship about each tubular member thereby defining a narrow annular passage therebetween through which conveying gas may pass upwardly from said gas plenum.

2. An apparatus for fluidizing a particulate material for transport in a conveying gas comprising:

a. a vertically disposed housing defining a chamber therein;

b. a perforated bed support plate having gas flow passages therethrough, said bed support plate disposed within said housing so as to extend across said housing thereby dividing said chamber into a gas plenum beneath said bed support plate and a particulate fluidizing plenum above said bed support plate;

c. particulate feed means opening into the particulate fluidizing plenum so as to deposit particulate material onto said bed support plate;

d. gas supply means opening into said gas plenum for conveying pressurized conveying gas to said gas plenum to pass therefrom through the gas flow passages in said bed support plate whereby a portion of the particulate material fed to the fluidizing plenum is fluidized so as to establish a discrete bed of fluidized material superadjacent to said bed support plate and a splash zone within said fluidizing plenum above said discrete bed;

e. a plurality of transport conduits penetrating said housing and extending into the particulate fluidizing plenum and being independently positionable therein so as to open in the splash zone at a selected distance above said discrete bed, said transport conduits for receiving a particulate material fluidized in the conveying gas from the splash zone and conveying said received particulate material from said housing together with the conveying gas supplied to the particulate fluidizing plenum as a conveying medium for the particulate material, said transport conduits comprising elongated tubular members penetrating said housing from below and extending vertically upward through said gas plenum, thence through said bed support plate and thence through said discrete bed to open into the splash zone above said discrete bed; and f. a plurality of tubular sleeves mounted to and penetrating said bed support plate, said tubular sleeve disposed coaxially about said tubular member in closely spaced relationship thereby defining a narrow annular passage therebetween through which conveying gas may pass upwardly from said gas plenum.

* * * * *